(No Model.) 2 Sheets—Sheet 1.
J. D. COX.
MACHINE FOR SCALDING TOMATOES.

No. 494,463. Patented Mar. 28, 1893.

(No Model.) 2 Sheets—Sheet 2.

J. D. COX.
MACHINE FOR SCALDING TOMATOES.

No. 494,463. Patented Mar. 28, 1893.

Witnesses:
Jas. E. Hutchinson
Henry C. Hazard

Inventor:
James D. Cox
by Prindle and Russell
his Attorneys

UNITED STATES PATENT OFFICE.

JAMES D. COX, OF BRIDGETON, NEW JERSEY.

MACHINE FOR SCALDING TOMATOES.

SPECIFICATION forming part of Letters Patent No. 494,463, dated March 28, 1893.

Application filed September 21, 1892. Serial No. 446,362. (No model.)

*To all whom it may concern:*

Be it known that I, JAMES D. COX, a citizen of the United States, residing at Bridgeton, in the county of Cumberland, and in the State of New Jersey, have invented certain new and useful Improvements in Machines for Scalding Tomatoes, &c.; and I do hereby declare that the following is a full, clear, and exact description thereof, reference being had to the accompanying drawings, in which—

Figure 1:
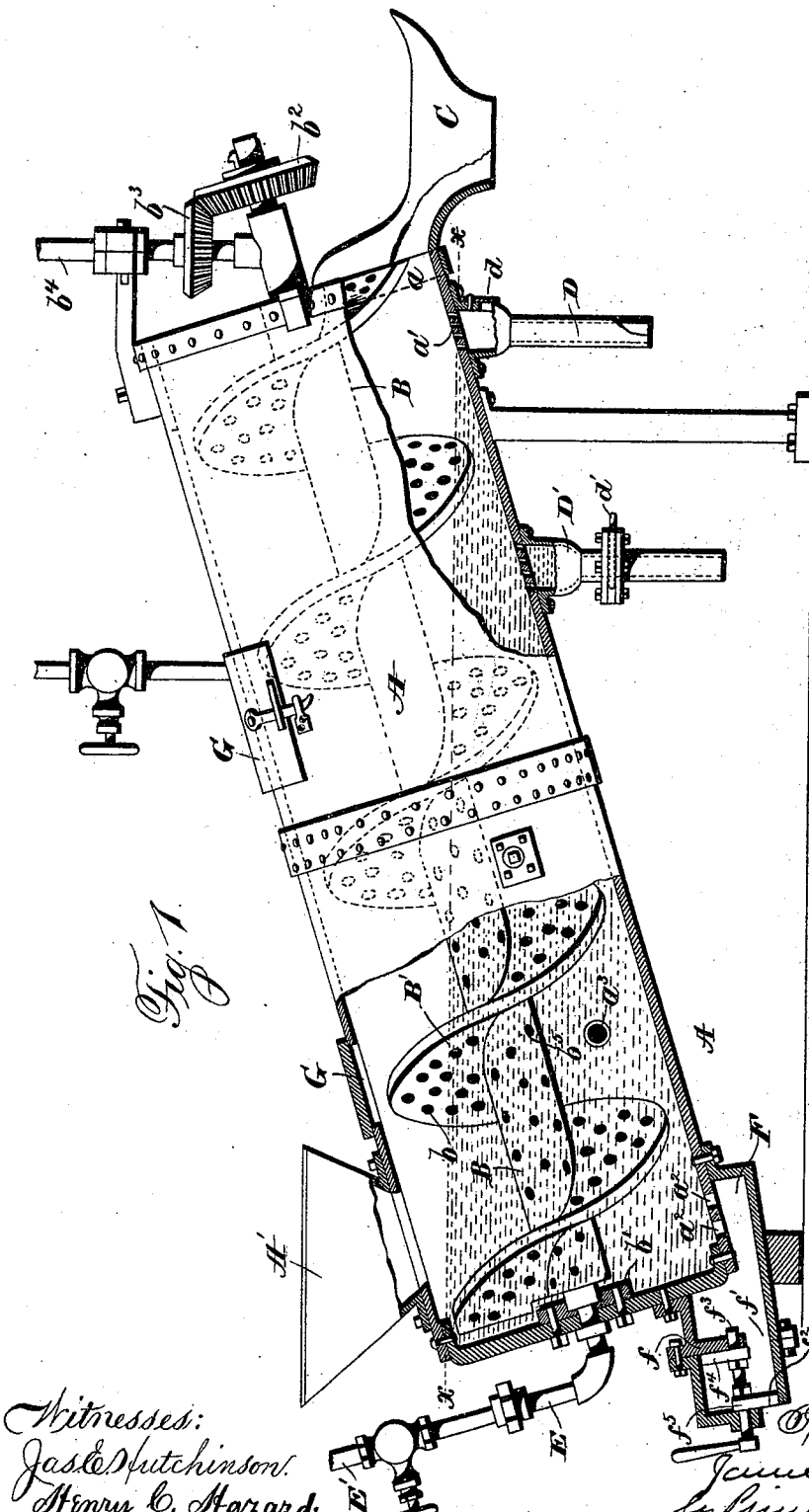
Figure 2:
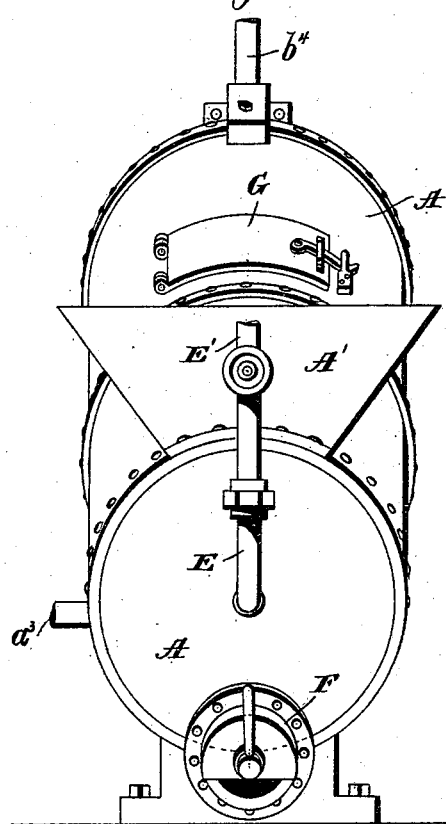
Figure 3:
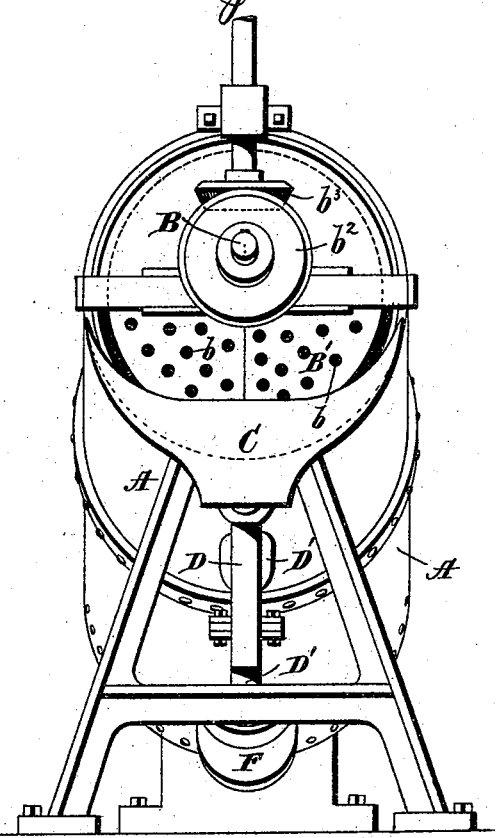
Figure 4:
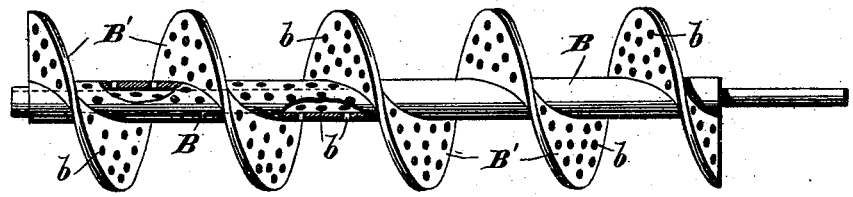
Figure 5:

Figure 1 shows a view of my apparatus partly in side elevation, and partly in longitudinal vertical section; Fig. 2, a front end view of the same; Fig. 3, a rear end view; Fig. 4, a detail view showing the shaft and conveyer screw in side elevation, and Fig. 5, a detail view showing the construction of sand trap valves.

Letters of like name and kind refer to like parts in each of the figures.

The object of my invention has been to provide an improved machine for scalding tomatoes or other fruit, for canning, which shall perform the scalding effectively and continuously, as long as the material to be treated is supplied to it, shall be readily and quickly adjustable, to regulate the amount of scalding, according to the degree of ripeness of the fruit supplied, and shall, during the scalding operation, separate all sand and grit that may be among or on the fruit, so that it can be readily taken out of the apparatus and removed, without loss of any of the material being treated, and to this end—

My invention consists in the apparatus and in the parts thereof, constructed, arranged, and combined, as hereinafter specified.

While I shall hereinafter describe my invention, as arranged and used for the scalding of tomatoes, in the process of preparing them for canning, I desire it to be understood that my apparatus can be similarly employed to advantage on other fruits, vegetables, &c.

In the drawings, A designates a casing, preferably of iron or steel, which, while shown as cylindrical, can be of any other desired shape. As used by me, in practice, it has a diameter of about three feet, and a length of about eight feet though such proportions can, of course, be departed from, if desirable in any case. This casing is set upon a suitable bed or foundation, so that it will stand at an angle, with its rear or discharge end higher than the other, as shown in Fig. 1. Within and extending longitudinally through it is a shaft B, carrying a screw flange or web B'—which has such diameter, as to nearly, but not quite, reach the inner wall of the casing, and is perforated as indicated at $b, b$, the perforations being large enough to permit the ready passage of water, but not of the pulp of tomato, or other material. The shaft B is supported at its forward end in a bearing ring $b'$, which is bolted or otherwise attached to the inner side of the casing A; while its rear and upper end extends through and beyond a bearing on the casing end, and is there provided with a gear wheel $b^2$ meshing with another gear $b^3$, on a shaft $b^4$, which is to be connected with any driving power or motor, so as to be rotated thereby. Below the bearing of the shaft, the outer and farther end of the casing is left open, so as to provide a discharge outlet for the scalded material from the interior of the casing into a pan or wide mouthed hopper C, which will receive said material and guide it into a bucket or other receptacle provided therefor.

When the apparatus is in use, I keep within the casing a body of water, which will normally stand at the level indicated by the line $x, x$, extending, because of the inclination of the casing, at an angle to the latter and the shaft axis, from a point at or near the upper side of the front end of the casing, to a point near, but below the lower edge of the discharge opening $a$.

In order that the water may not, by reason of the condensation of the steam used, or irregularity of the water supply rise above the line indicated, and flow out with the scalded material, over the edge of said opening into hopper C, I provide the overflow pipe D, communicating with the interior of the casing at a point $a$ certain distance from and below the edge of the discharge opening. To prevent any of the treated material getting out through the pipe with the water, the communication between the latter and the interior of the casing is made through a series of small holes $a'$, $a'$, adapted to act as a strainer. To provide for the ready cleaning out of the pipe, it has an opening in its side normally covered by the gate or valve $d$.

In order that the level of the scalding water within the casing may be lowered, for a purpose to be described hereinafter, I place at $D'$ a second pipe communicating with the interior of the casing in the same manner as pipe D, but at a lower point. A slide valve $d'$ serves to normally close this pipe, when the higher level of water is desired.

The shaft B is made hollow from its lower end to a point just below where it would pass up out of the water body when the latter is at its higher level, and has numerous small holes $b^5$ throughout the walls of its hollow part, to admit the outflow of steam supplied to the interior of the shaft. The upper portion of the shaft beyond the point where the latter passes up beyond the level of the water, can, of course, be hollow, also, but it should have its walls imperforate, if it is tubular. Steam is supplied to the lower end of the shaft bore, through a pipe E, passing in through a suitable opening in the end wall of the casing. Such pipe is to be connected by valved pipe $E'$, with any suitable source of steam supply.

In the top of the forward and lower part of casing A, is a feed opening down through which feed hopper $A'$ can discharge the tomatoes or other material to be treated; while, on the under side of such part, is a sand trap F, to catch any sand which may be upon or mixed with the material introduced. It consists of a box or casing in communication with the lowest part of the interior of the casing, through small holes $a^2$, $a^2$ in the casing bottom, and, preferably, set at an angle, as shown, so that its bottom will extend downward and forward to cause the sand entering it to work toward the front or discharge end of the trap. Within the trap casing near its forward end, is a partition $f$, which does not extend to the bottom of the latter, but stops short thereof, so as to leave an opening $f'$ in line with a similar opening $f^2$ in the outer end of the casing. Journaled in such end and the partition $f$, above the openings $f'$, $f^2$, is the rocking valve shaft $f^3$ carrying the slide valves $f^4$ $f^5$, to close the respective openings alternately, so that, when one is entirely open, the other will be shut. For this purpose said valves are set on opposite sides of the shaft, and each one consists of a plate which is a little more than a semi disk, a large enough portion being removed to clear the respective opening, when the shaft is turned to bring the valve on its upper side.

This construction and arrangement enable me to close the inner opening, to prevent the escape of liquid, while unclosing the outer opening, to allow the removal of sand from the chamber or space between the two valves, or by a partial turn of the valves to leave the ports or openings $f'$, $f^2$, both partially opened, so that the flow of liquid will flush out the trap.

At G, G, are man holes, provided with suitable covers, to allow ready access to different parts of the screw conveyer, so that the latter can be cleaned or cleared of vines, &c., at any time.

The desired amount of water can be run into the casing A through opening $a^3$, a suitable pipe, connected with such opening, being supplied with water, which can be taken from any tank or source of supply, and can be the water of condensation from the exhaust steam of the engine, if found desirable.

The operation of my machine is briefly, as follows:—With the body of scalding water filling the inclined cylinder up to line $x$, $x$, steam being run into the hollow part of the shaft B, so as to escape therefrom through holes $b^5$, $b^5$, into the water and heat the latter, and said shaft being rotated by the described gearing, the tomatoes to be scalded, are poured into the feed hopper $A'$, from which they fall into the water where it is deepest, in the lowest part of the cylinder. By the screw flange or fin on the shaft, they are then moved onward through the steam heated scalding water, and ascending the inclined lower side of the cylinder or casing, are discharged from the upper end thereof into the hopper or pan C from which they are delivered into a bucket or other desired receptacle. The water flows back around the screw flange and through the holes therein, which are provided to allow for such flow, so that it is not forced out of the upper end of the casing with the scalded material. As the latter has been not only moved along through, but intimately mixed with the water, by the screw, the scalding is thorough and uniform. While the material is being mixed or stirred up with water, and carried along through the casing, any sand, which may have entered the latter with the material works downward, until it reaches the inclined bottom of the casing. As it is then out of reach of, and not acted upon by the screw flange or plate on the shaft, it works downward over such bottom to the lower forward end thereof from which it drops through holes $a^2$ $a^2$ into the sand trap casing. Here it works forward and downward over the inclined trap bottom toward the front end thereof. With the rock shaft turned to close the outer valve $f^5$, and leave the inner one $f^4$ open, the sand will tend to collect in the chamber or space between partition $f$ and the outer end of the trap against valve $f^5$. If now, the valve shaft or stem be turned to open the outer valve, the inner one will be closed, so that the sand can be removed from said space or chamber in the trap; while the liquid is held back by the inner valve. If the loss of a small amount of liquid is not objectionable, the valves can be turned, so as to leave both ports or openings partly open for a short time. The outflow of liquid will then carry any collected sand out of the trap. As over ripe or soft tomatoes require a shorter exposure to the scalding medium than others, I have provided my machine with means, whereby the amount of liquid, through which the material treated will have to pass, can be regulated, at will, being diminished for the over ripe or soft fruit, and raised to the maximum for the less ripe. The valved pipe D', placed at a lower level than the normal overflow pipe D, affords ready means for securing the desired change of the level and, consequently, of the quantity of the water within the casing A. When a quantity of tomatoes to be scalded is over ripe or soft, the valve in pipe D' is opened, so that the scalding water will flow out, until its level reaches the edge of the passage or passages leading to the pipe. Such level will then be maintained as long as the valve $d'$ is kept open. When less ripe and harder fruit is to be scalded, said valve is closed, and the body of water is increased, until its level is raised to the normal overflow pipe D.

With the construction and arrangement described, I am, then, enabled to regulate the amount or length of the scalding operation, to suit different conditions of fruit, without changing the speed of rotation of the shaft B.

My machine, as described, is most cheap and simple in construction, having no parts likely to get out of order, and, in practice, has been found to be most efficient, thorough, and uniform in its treatment of the material being operated upon at any time.

With the steam, issuing through the many openings $b^5$ $b^5$ in the hollow part of shaft B, mingled with the water, the desired amount of scalding of the fruit can be secured in a short space of time, so that the action of the machine in receiving, treating, and discharging the scalded material can be made quite rapid.

Having thus described my invention, what I claim is—

1. In a machine for scalding tomatoes &c., in combination with a suitable casing containing a body of liquid, the rotary hollow shaft, extending through the body of liquid, and having perforations through its walls, and a perforated screw flange, for engaging and forcing the material along through the liquid, and a source of supply of steam connected with the interior of the shaft, substantially as and for the purpose shown.

2. In combination with the casing having an inclined bottom, a feed opening over the lower part of such bottom, and a discharge opening at the upper end of the latter, the rotary shaft, also inclined, provided with a screw flange, and having its lower portion made hollow with perforated walls, a body of liquid within the casing, and a pipe, to be connected with a source of supply of steam or other heating medium, communicating with the interior of the shaft, substantially as and for the purpose specified.

3. In combination with the casing having an inclined bottom, a feed inlet above the lower part of such bottom, and a discharge opening at the upper end of the latter, the rotary shaft also inclined, having its lower part hollow, and with perforated walls, and a screw flange also perforated, means for connecting the interior of the shaft with a source of supply of steam or other heating medium, substantially as and for the purpose shown.

4. In combination with the casing having an inclined bottom, a feed inlet over the lower portion of the latter, a discharge outlet at the upper end thereof, and the liquid overflow passage at a point in the bottom below the level of the discharge outlet, and a rotary shaft having a screw flange to force any material in the casing up the inclined bottom thereof, to the discharge outlet, substantially as and for the purpose set forth.

5. In combination with the casing having an inclined bottom, a feed inlet over the lower portion thereof, a discharge outlet at its upper end, and two liquid overflow passages, at different points below the level of the discharge outlet, a valve for the lower of such passages, and the rotary shaft having the screw flange, to engage and force any material in the casing, up the inclined bottom of the latter to the discharge outlet, substantially as and for the purpose described.

6. In combination with the casing having the inclined bottom, and the conveyer to convey any material up such bottom, the sand trap at the lower end of the latter, consisting of a casing in communication with the interior of the large casing through one or more holes in the bottom thereof, and having an outlet at its outer end, a valve to close such outlet, and another valve to check the flow of liquid from the larger casing out through the trap outlet, while the valve for closing the latter is open to allow the sand to be removed, substantially as and for the purpose specified.

7. In combination with the casing having the inclined bottom provided with one or more small openings at or near its lower end, the box or small casing below the inclined bottom adapted to receive sand falling through the opening or openings therein, and having the outlet port at its outer end and a second port in a partition at some distance from such end, and the two valves, one for each port, connected together, so that, as one is moved to close its port, the other will be moved to open the other port, substantially as and for the purpose shown.

8. In combination with the inclined casing having a discharge outlet at its upper end and a body of liquid partly filling it, a liquid overflow pipe communicating through one or more small openings, adapted to permit the passage of liquid, but not of the material being treated, with the under side of the casing interior, at a point below the level of the lower side of the discharge outlet, the inclined rotary shaft having its part within the lower portion of the casing hollow, and with perforated walls, and the perforated screw flange, and a steam supply pipe connected with the interior of the hollow part of the shaft, substantially as and for the purpose set forth.

In testimony that I claim the foregoing I have hereunto set my hand this 14th day of September, 1892.

JAMES D. COX.

Witnesses:
D. O. FRAZEUR,
JOS. RIGGINS.